United States Patent
Akou

(10) Patent No.: US 12,475,036 B2
(45) Date of Patent: Nov. 18, 2025

(54) SEMICONDUCTOR STORAGE DEVICE

(71) Applicant: Kioxia Corporation, Tokyo (JP)

(72) Inventor: Masayuki Akou, Yokohama (JP)

(73) Assignee: Kioxia Corporation, Tokyo (JP)

( * ) Notice: Subject to any disclaimer, the term of this patent is extended or adjusted under 35 U.S.C. 154(b) by 113 days.

(21) Appl. No.: 18/437,038

(22) Filed: Feb. 8, 2024

(65) Prior Publication Data

US 2024/0303186 A1 Sep. 12, 2024

(30) Foreign Application Priority Data

Mar. 8, 2023 (JP) .................. 2023-035895

(51) Int. Cl.
*G06F 12/02* (2006.01)
*G11C 11/56* (2006.01)
*G11C 16/04* (2006.01)
*G11C 16/08* (2006.01)
*G11C 16/16* (2006.01)

(52) U.S. Cl.
CPC .. *G06F 12/0246* (2013.01); *G06F 2212/7211* (2013.01); *G11C 11/5635* (2013.01); *G11C 16/0483* (2013.01); *G11C 16/08* (2013.01); *G11C 16/16* (2013.01)

(58) Field of Classification Search
CPC ......... G06F 12/0246; G06F 2212/7211; G11C 11/5635; G11C 16/0483; G11C 16/08; G11C 16/16; H10B 43/27
USPC ........................................ 365/185.29
See application file for complete search history.

(56) References Cited

U.S. PATENT DOCUMENTS

| | | | | |
|---|---|---|---|---|
| 2002/0159315 | A1* | 10/2002 | Noguchi | H10B 69/00 257/E27.103 |
| 2018/0277217 | A1 | 9/2018 | Kumazaki et al. | |
| 2019/0272879 | A1 | 9/2019 | Sudo | |
| 2020/0090753 | A1* | 3/2020 | Wang | G11C 16/0483 |
| 2022/0284961 | A1 | 9/2022 | Prakash et al. | |
| 2022/0310159 | A1* | 9/2022 | Shiga | G11C 16/08 |
| 2023/0317181 | A1* | 10/2023 | Kikuchi | G11C 16/3445 365/185.22 |
| 2025/0095726 | A1* | 3/2025 | Shirakawa | H03M 13/2906 |

* cited by examiner

*Primary Examiner* — Ly D Pham
(74) *Attorney, Agent, or Firm* — Oblon, McClelland, Maier & Neustadt, L.L.P.

(57) ABSTRACT

A semiconductor storage device according to an embodiment includes a first word line connected to a gate of a first memory cell transistor, a second word line connected to a gate of a second memory cell transistor, a first word line selection transistor capable of supplying a voltage from a voltage supply circuit to the first word line, a second word line selection transistor capable of supplying the voltage from the voltage supply circuit to the second word line, an insulating film provided between the first word line selection transistor and the second word line selection transistor, and a first wiring having at least a part provided on the insulating film and extending in a first direction, in which the voltage supply circuit is capable of supplying a first voltage lower than a ground voltage to the first wiring.

10 Claims, 13 Drawing Sheets

SEMICONDUCTOR STORAGE DEVICE

CROSS-REFERENCE TO RELATED APPLICATIONS

This application is based upon and claims the benefit of priority from the prior Japanese Patent Application No. 2023-035895 filed in Japan on Mar. 8, 2023; the entire contents of which are incorporated herein by reference.

FIELD

Embodiments described herein relate generally to a semiconductor storage device.

BACKGROUND

A NAND-type memory has been known as one type of semiconductor storage device. In such a semiconductor storage device, there has been a request to reduce a chip area to achieve a higher density.

DETAILED DESCRIPTION

A semiconductor storage device according to an embodiment includes a first memory cell transistor, a first word line connected to a gate of the first memory cell transistor, a second memory cell transistor, a second word line connected to a gate of the second memory cell transistor, a voltage supply circuit configured to generate a voltage corresponding to an erasing operation for the first memory cell transistor and the second memory cell transistor, a first word line selection transistor capable of supplying the voltage from the voltage supply circuit to the first word line, a second word line selection transistor capable of supplying the voltage from the voltage supply circuit to the second word line, an insulating film provided between the first word line selection transistor and the second word line selection transistor, and a first wiring having at least a part provided on the insulating film and extending in a first direction, in which the voltage supply circuit is capable of supplying a first voltage lower than a ground voltage to the first wiring.

Embodiments will be described in detail below with reference to the drawings.

Embodiment

The present embodiment is directed to providing a structure that suppresses a leak current easy to generate between adjacent diffusion layers of a transistor included in a switch in a row decoder, thereby reducing an occupied area of the switch to achieve a higher density.

(Configuration of Memory System)

Figure 1:
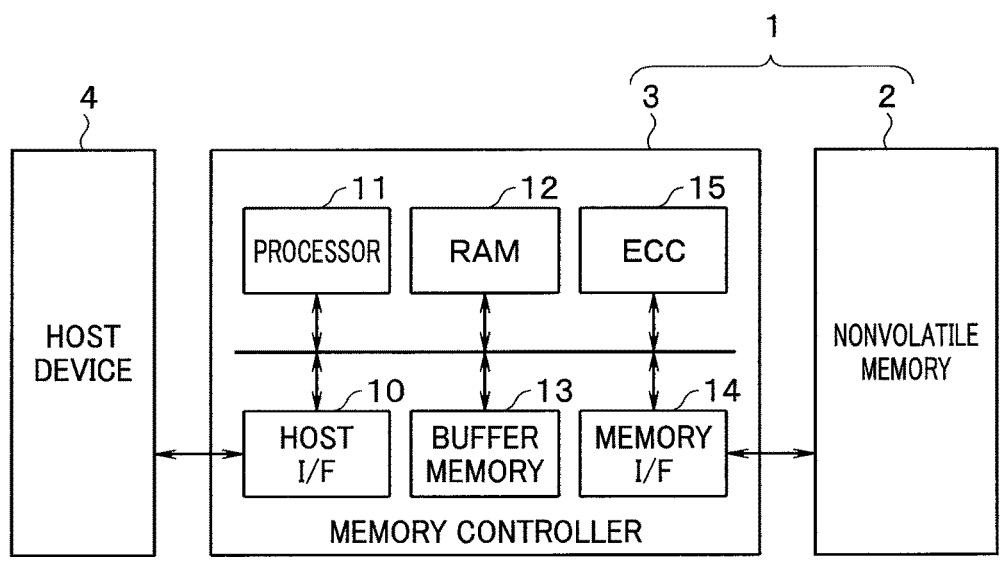
FIG. 1 is a block diagram illustrating a configuration example of a memory system.

FIG. 1 is a block diagram illustrating a configuration example of a memory system. The memory system 1 according to the present embodiment includes a memory controller 3 and a nonvolatile memory 2. Note that the nonvolatile memory 2 may include a plurality of memory chips. The memory system 1 can be connected to a host device 4. An example of the host device 4 is an electronic device such as a personal computer or a portable terminal.

The memory system 1 may be configured by mounting the plurality of chips included in the memory system 1 on a mother board on which the host device 4 is mounted, or the memory system 1 may be configured as a system LSI (large-scale integrated circuit) or an SoC (system-on-a-chip) to be implemented by one module. Examples of the memory system 1 include a memory card such as an SD card, an SSD (solid-state-drive), and an eMMC (embedded-multi-media-card).

The nonvolatile memory 2 is a NAND-type flash memory including a plurality of memory cells, and stores data in a nonvolatile manner. A specific configuration of the nonvolatile memory 2 will be described below.

The memory controller 3 issues writing (also referred to as programming), reading, and erasing instructions, for example, to the nonvolatile memory 2 in response to an instruction from the host device 4, for example. The memory controller 3 manages a memory space of the nonvolatile memory 2. The memory controller 3 includes a host interface (host I/F) circuit 10, a processor 11, a RAM (random access memory) 12, a buffer memory 13, a memory interface (memory I/F) circuit 14, an ECC (error checking and correcting) circuit 15, and the like.

The host I/F circuit 10 is connected to the host device 4 via a host bus. Interface processing is performed between the host I/F circuit 10 and the host device 4. The host I/F circuit 10 transmits and receives an instruction, an address, and data to and from the host device 4.

The processor 11 includes a CPU (central processing unit), for example. The processor 11 controls an operation of the entire memory controller 3. For example, when receiving a writing instruction from the host device 4, the processor 11 issues to the nonvolatile memory 2 a writing instruction corresponding to the writing instruction from the host device 4 via the memory I/F circuit 14. The same applies to cases of reading and erasing. The processor 11 performs various types of processing for managing the nonvolatile memory 2, for example, wear leveling.

The RAM 12 is used as a work area of the processor 11, and stores firmware data loaded from the nonvolatile memory 2, various types of tables generated by the processor 11, and the like. An example of the RAM 12 is a DRAM or an SRAM.

The buffer memory 13 temporarily stores data transmitted from the host device 4 and temporarily stores data transmitted from the nonvolatile memory 2.

The memory I/F circuit 14 is connected to the nonvolatile memory 2 via a bus. Interface processing is performed between the memory I/F circuit 14 and the nonvolatile memory 2. The memory I/F circuit 14 transmits and receives an instruction, an address, and data to and from the nonvolatile memory 2.

When writing data, the ECC circuit 15 generates an error correction code for the written data, adds the error correction code to the written data, and sends the written data to the memory I/F circuit 14. When reading data, the ECC circuit 15 performs error detection and/or error correction for the read data using an error correction code included in the read data. Note that the ECC circuit 15 may be provided in the memory I/F circuit 14.

(Configuration of Nonvolatile Memory)

Figure 2:
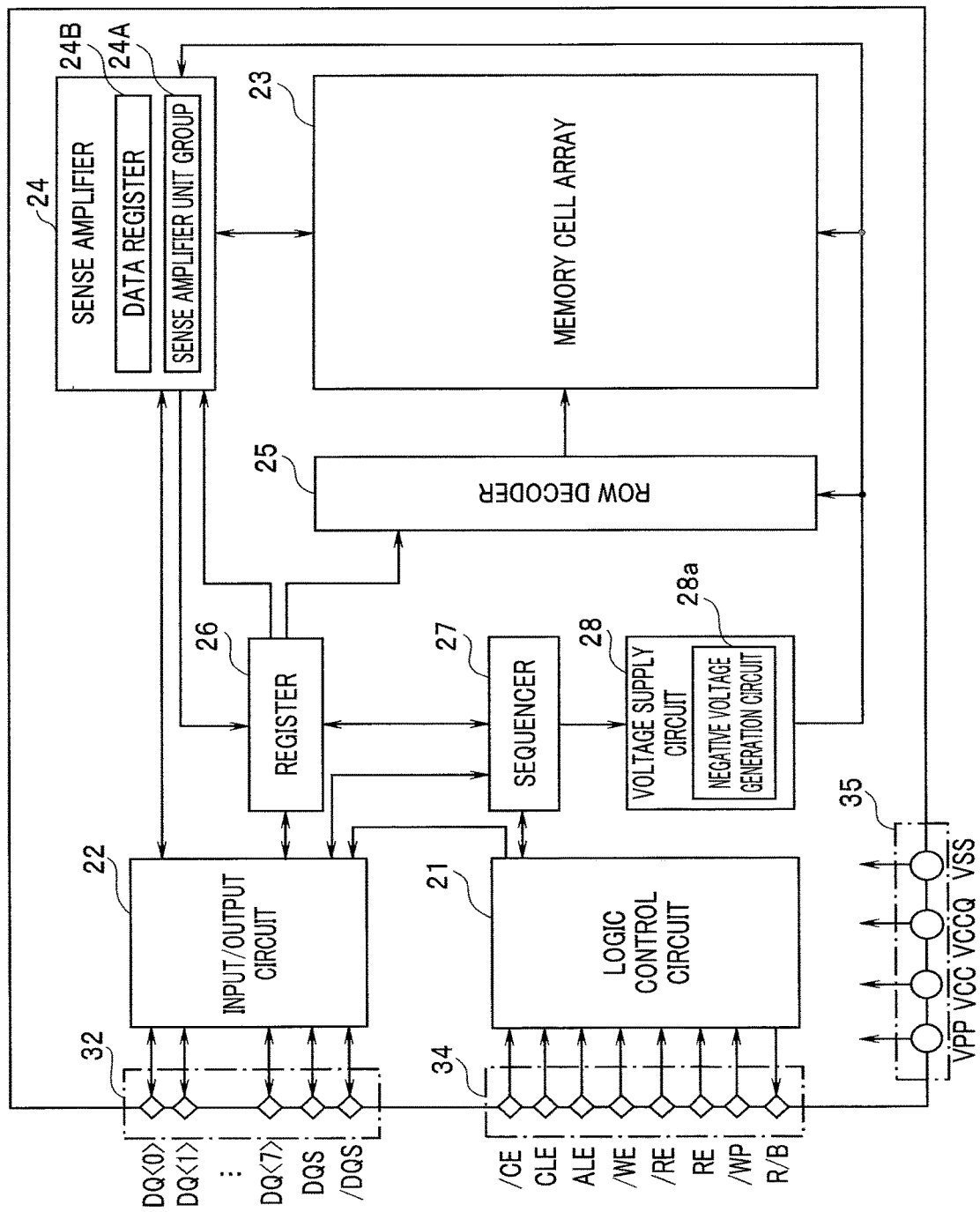
FIG. 2 is a block diagram illustrating an example of a nonvolatile memory 2 illustrated in FIG. 1.

FIG. 2 is a block diagram illustrating an example of the nonvolatile memory 2 illustrated in FIG. 1. The nonvolatile memory 2 includes a logic control circuit 21, an input/output circuit 22, a memory cell array 23, a sense amplifier 24, a row decoder 25, a register 26, a sequencer 27, a voltage supply circuit 28, an input/output pad group 32, a logic control pad group 34, and a power inputting terminal group 35.

The memory cell array 23 includes a plurality of blocks. Each of the plurality of blocks BLK includes a plurality of memory cell transistors (memory cells). In the memory cell array 23, a plurality of bit lines, a plurality of word lines, a source line, and the like are disposed to control a voltage to be applied to the memory cell transistors. A specific configuration of the block BLK will be described below.

The input/output pad group 32 includes a plurality of terminals (pads) respectively corresponding to signals DQ<0> to DQ<7> and data strobe signals DQS and/DQS to transmit and receive each of the signals including data to and from the memory controller 3.

The logic control pad group 34 includes a plurality of terminals (pads) respectively corresponding to a chip enable signal/CE, a command latch enable signal CLE, an address latch enable signal ALE, a write enable signal/WE, read enable signals RE and/RE, a write protect signal/WP, and a ready/busy signal R/B to transmit and receive each of the signals to and from the memory controller 3.

The signal/CE enables the nonvolatile memory 2 to be selected. The signal CLE enables a command to be transmitted as the signal DQ to be latched into a command register. The signal ALE enables an address to be transmitted as the signal DQ to be latched into an address register. The signal WE enables writing. The signal RE enables reading. The signal WP inhibits writing and erasing. The ready/busy signal R/B indicates whether the nonvolatile memory 2 is in a ready state (a state where an instruction from outside can be received) or a busy state (a state where an instruction from outside cannot be received). The memory controller 3 can know a state of the nonvolatile memory 2 by receiving the ready busy signal R/B.

The power inputting terminal group 35 includes a plurality of terminals respectively receiving power source voltages VCC, VCCQ, and VPP and a ground voltage VSS to supply various types of operating power to the nonvolatile memory 2 from outside. The power source voltage VCC is a circuit power source voltage to be generally applied from outside as operating power. As the power source voltage VCC, a voltage of about 3.3 volts, for example, is inputted. As the power source voltage VCCQ, a voltage of 1.2 volts, for example, is inputted. The power source voltage VCCQ is used when a signal is transmitted and received between the memory controller 3 and the nonvolatile memory 2.

The power source voltage VPP is a higher power source voltage than the power source voltage VCC. As the power source voltage VPP, a voltage of 12 volts, for example, is inputted. When data is written into or erased from the memory cell array 23, a high voltage of about 20 volts is required. In this case, a desired voltage can be generated at higher speed and with lower power consumption by raising a power source voltage VPP of about 12 volts than by raising a power source voltage VCC of about 3.3 volts using a boosting circuit of the voltage supply circuit 28. The power source voltage VCC is power to be standardly supplied to the nonvolatile memory 2, and the power source voltage VPP is power to be additionally and optionally supplied depending on a usage environment, for example.

Each of the logic control circuit 21 and the input/output circuit 22 is connected to the memory controller 3 via a NAND bus. The input/output circuit 22 transmits and receives the signals DQ (e.g., DQ<0> to DQ<7>) to and from the memory controller 3 via the NAND bus.

The logic control circuit 21 receives external control signals (e.g., the chip enable signal/CE, the command latch enable signal CLE, the address latch enable signal ALE, the write enable signal/WE, the read enable signals RE and/RE, and the write protect signal/WP) from the memory controller 3 via the NAND bus. The logic control circuit 21 transmits the ready/busy signal R/B to the memory controller 3 via the NAND bus.

The input/output circuit 22 transmits and receives the signals DQ<0> to DQ<7> and the data strobe signals DQS and/DQS to and from the memory controller 3. The input/output circuit 22 transfers a command and an address in the signals DQ<0> to DQ<7> to the register 26. The input/output circuit 22 transmits and receives written data and read data to and from the sense amplifier 24.

The register 26 includes a command register, an address register, a stator register, and the like. The command register temporarily stores a command. The address register temporarily stores an address. The stator register temporarily stores data required to operate the nonvolatile memory 2. The register 26 is configured of, for example, an SRAM.

The sequencer 27 receives a command from the register 26, and controls the nonvolatile memory 2 according to a sequence based on the command.

The voltage supply circuit 28 is controlled by the sequencer 27, to receive a power source voltage from outside the nonvolatile memory 2 and generate a plurality of voltages required for a writing operation, a reading operation, and an erasing operation using the power source voltage. In the present embodiment, the voltage supply circuit 28 includes a negative voltage generation circuit 28a. The negative voltage generation circuit 28a converts the ground voltage VSS inputted via the power inputting terminal group 35 into a negative voltage VBB lower than 0 volts. The negative voltage VBB is used by the row decoder 25 described below, for example. For example, VBB is less than 0 volts and −3 volts or more. For example, VBB is more than −3 volts and less than −5 volts.

The row decoder 25 receives a row address from the register 26, and decodes the row address. The row decoder 25 performs an operation for selecting a word line on the basis of the decoded row address. The row decoder 25 transfers a plurality of voltages required for a writing operation, a reading operation, and an erasing operation to a selected block.

The sense amplifier 24 receives a column address from the register 26, and decodes the column address. The sense amplifier 24 includes a sense amplifier unit group 24A and a data register 24B. The sense amplifier unit group 24A is connected to bit lines, and selects any one of the bit lines on the basis of the decoded column address. When reading data, the sense amplifier unit group 24A senses and amplifies the data read to the bit line from the memory cell transistor. When writing data, the sense amplifier unit group 24A transfers the written data to the bit line.

When reading data, the data register 24B temporarily stores the data detected by the sense amplifier unit group 24A and serially transfers the data to the input/output circuit 22. When writing data, the data register 24B temporarily stores the data serially transferred from the input/output circuit 22 and transfers the data to the sense amplifier unit group 24A. Examples of the data register 24B include an SRAM.

(Block Configuration of Memory Cell Array)

Figure 3:
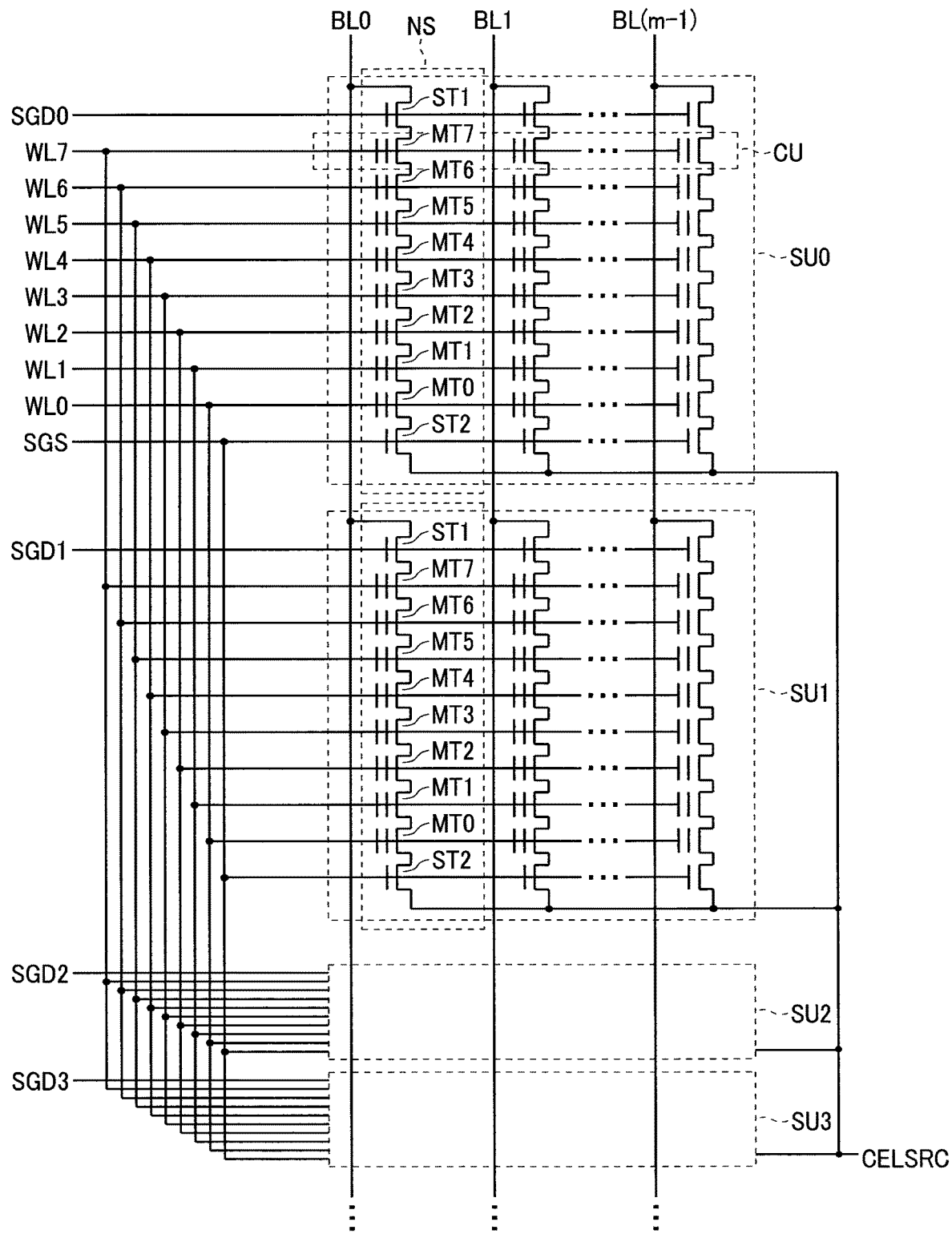
FIG. 3 is a diagram illustrating a configuration example of a block in a memory cell array 23 having a three-dimensional structure.

FIG. 3 is a diagram illustrating a configuration example of a block in the memory cell array 23 having a three-dimensional structure. FIG. 3 illustrates one block BLK among a plurality of blocks included in the memory cell array 23. The other block in the memory cell array 23 has a similar configuration to the configuration illustrated in FIG. 3.

As illustrated, the block BLK includes four string units SU0 to SU3 (hereinafter representatively referred to as string units SU), for example. Each of the string units SU includes a NAND string NS including a plurality of memory cell transistors MT (MT0 to MT7) and select gate transistors ST1 and ST2. Note that the number of memory cell transistors MT included in the NAND string NS is eight in FIG. 3 but may be larger than eight. The select gate transistors ST1 and ST2 may be the same as the memory cell transistors in structure, although represented as one transistor in an electrical circuit. A plurality of select gate transistors may be used as each of the select gate transistors ST1 and ST2. Further, a dummy cell transistor may be provided between the memory cell transistors MT and each of the select gate transistors ST1 and ST2.

The memory cell transistors MT are arranged to be connected in series between the select gate transistors ST1 and ST2. The memory cell transistor MT7 on one end side (on the bit line side) is connected to the select gate transistor ST1, and the memory cell transistor MT0 on the other end side (the source line side) is connected to the select gate transistor ST2.

The select gate transistors ST1 in the string units SU0 and SU3 have their respective gates respectively connected to select gate lines SGD0 to SGD3 (hereinafter representatively referred to as select gate lines SGD). The select gate transistors ST2 in the string units SU0 and SU3 have their respective gates connected to a common select gate line SGS. Note that the gates of the plurality of select gate transistors ST2 in each of the blocks BLK may be respectively connected to select gate lines SGS0 to SGS3 not illustrated (hereinafter representatively referred to as select gate lines SGS).

The memory cell transistors MT0 to the memory cell transistors MT7 in the same block BLK have their respective gates respectively connected to the common word lines WL0 to WL7. In other words, the word lines WL0 to WL7 are shared among the plurality of string units SU0 to SU3 in the same block BLK, while the select gate lines SGD are independent for the string units SU0 to SU3 even in the same block BLK. The respective gates of the memory cell transistors MTi (i is 0 to 7 in FIG. 3) on the same rows in the block BLK are respectively connected to the same word line WLi.

Each of the NAND strings NS is connected to a corresponding bit line. Therefore, each of the memory cell transistors MT is connected to the bit line via the select gate transistors ST1 and ST2 and the other memory cell transistors MT included in the NAND string NS. Generally, respective data in the memory cell transistors MT in the same block BLK are collectively erased. Data is collectively read and written typically from and into the plurality of memory cell transistors MT commonly connected to the one word line WL disposed in the one string unit SU. Such a set of the memory cell transistors MT sharing the word line WL in the one string unit SU is referred to as a cell unit CU.

A writing operation and a reading operation into and from the cell unit CU are performed in units of pages. When each of cells is a TLC (triple level cell) capable of storing 3-bit (octal value) data, the one cell unit CU can store data corresponding to three pages. Three bits that can be stored by each of the memory cell transistors MT respectively correspond to the three pages.

Note that states of the select gate transistors ST1 and ST2 are respectively controlled by the select gate lines SGD and SGS and states of the memory cell transistors MT0 to MT7 are respectively controlled by the word lines WL0 to WL7.

(Cross-Sectional Structure of Nonvolatile Memory)

Figure 4:
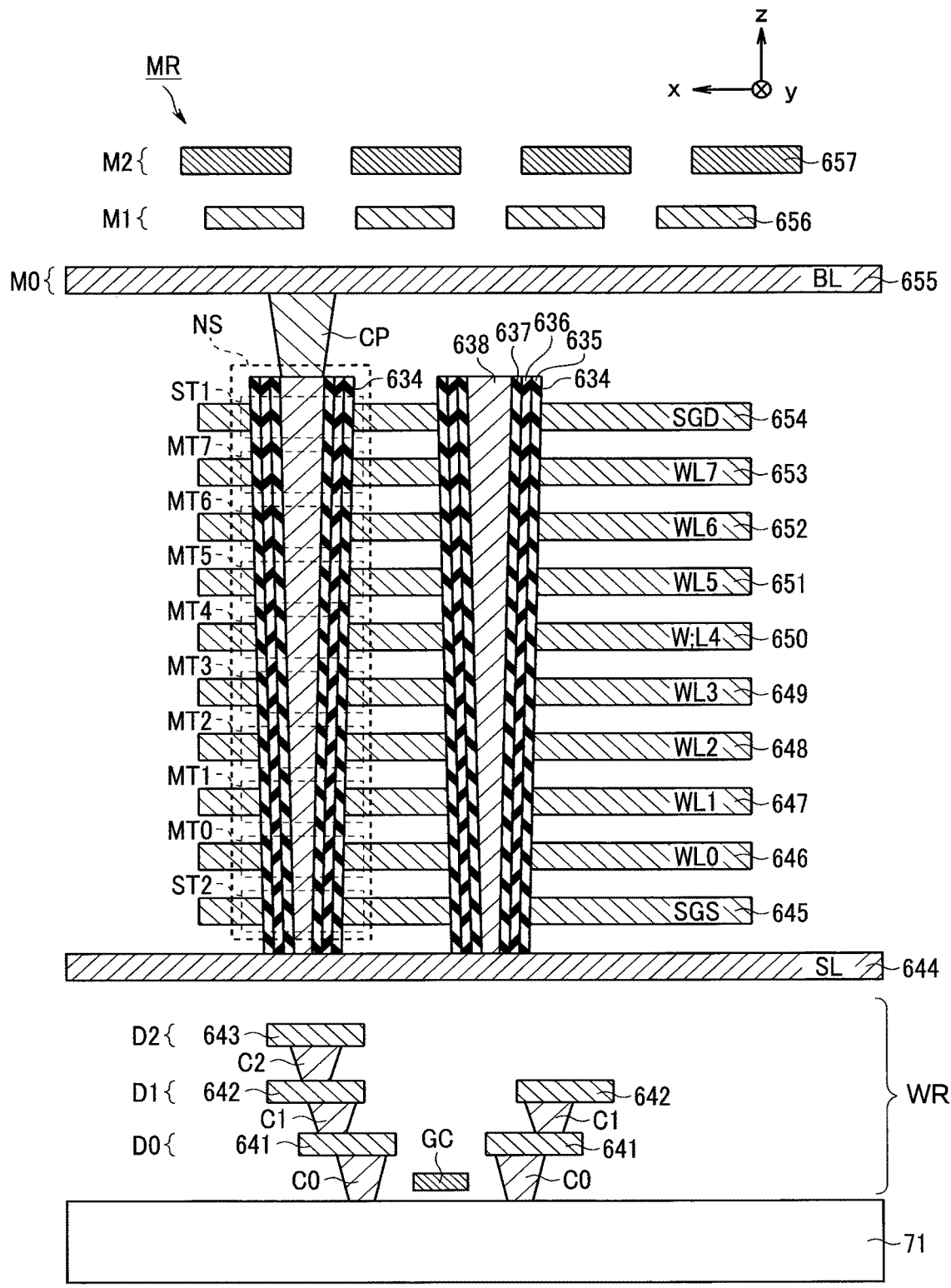
FIG. 4 is a cross-sectional view of a partial region of a semiconductor storage device according to an embodiment.

FIG. 4 is a cross-sectional view of a partial region of the semiconductor storage device according to the embodiment. FIG. 4 illustrates an example in which a peripheral circuit region corresponding to peripheral circuits such as the sense amplifier 24 and the row decoder 25 is provided on a semiconductor substrate 71 and a memory region is provided on an upper layer of the peripheral circuit region. Note that in the following description, two directions horizontal with respect to a surface of the semiconductor substrate 71 and perpendicular to each other are respectively set as an x-direction and a y-direction and a direction perpendicular to the surface of the semiconductor substrate 71 is set as a z-direction.

As illustrated in FIG. 4, the nonvolatile memory includes the semiconductor substrate 71, conductors 641 to 657, memory pillars 634, and contacts C0, C1, and C2, and a contact plug CP in a memory region MR. Note that in the drawings described below, illustration of each of a p-type or n-type well region formed in an upper surface portion of the semiconductor substrate 71, an impurity diffusion region formed in each of the well regions, and a gate insulating film and a device isolation region that insulate the well regions is omitted.

In the memory region MR, a conductor GC is provided on the semiconductor substrate 71 via a gate insulating film (not illustrated). A plurality of impurity diffusion regions (not illustrated) provided to sandwich the conductor GC in the semiconductor substrate 71 are respectively provided with the plurality of contacts C0, for example. The memory cell array 23 is arranged on the semiconductor substrate 71 via a wiring layer region WR.

The conductor 641 forming a wiring pattern is provided on each of the contacts C0. For example, the conductor GC functions as a gate electrode of a transistor, and the conductor 641 functions as a source electrode or a drain electrode of the transistor.

The contacts C1, for example, are respectively provided on the conductors 641. The conductor 642, for example, is provided on each of the contacts C1. The contact C2, for example, is provided on the conductor 642. The conductor 643, for example, is provided on the contact C2.

Wiring patterns respectively formed by the conductors 641, 642, and 643 are disposed in the wiring layer region WR. Wiring layers provided with the conductors 641, 642, and 643 are hereinafter respectively referred to as wiring layers D0, D1, and D2. The wiring layers D0, D1, and D2 are provided in a lower layer portion of the nonvolatile memory 2. Note that although the wiring layer region WR is provided with the three wiring layers, the wiring layer region WR may be provided with two or less wiring layers or four or more wiring layers.

A conductor 644 is provided above the conductor 643 via an interlayer insulating film, for example. The conductor 644 is formed in a plate shape parallel to an xy plane, for example, and functions as a source line CELSRC. The conductors 645 to 654 are sequentially stacked, for example, to correspond to each of the NAND strings NS above the conductor 644. An interlayer insulating film not illustrated is provided between the conductors adjacent to each other in the z-direction among the conductors.

Each of the conductors 645 to 654 is formed in a plate shape parallel to the xy plane, for example. For example, the conductor 645 functions as the select gate line SGS, the conductor 646 to 653 respectively function as the word lines WL0 to WL7, and the conductor 654 functions as the select gate line SGD.

Each of the memory pillars 634 is in a columnar shape, and penetrates the conductors 645 to 654 and contacts the conductor 644. The memory pillar 634 includes a pillar-shaped semiconductor layer (semiconductor pillar) semiconductor layer 638 formed on the center side, a tunnel insulating film 637 formed outside the semiconductor layer 638, a charge storage film 636 formed outside the tunnel insulating film 637, and a block insulating film 635 formed outside the charge storage film 636, for example.

For example, a portion where the memory pillar 634 and the conductor 645 intersect each other functions as the select gate transistor ST2. A portion where the memory pillar 634 and each of the conductors 646 to 653 intersect each other functions as the memory cell transistor (memory cell) MT. A portion where the memory pillar 634 and the conductor 654 intersect each other functions as the select gate transistor ST1.

A conductor 655 is provided in a higher layer than an upper surface of the memory pillar 634 via an interlayer insulating film. The conductor 655 is formed in a shape of a line extending in the x-direction, and corresponds to a bit line BL. A plurality of conductors 655 are arranged to be spaced apart from one another in the y-direction (not illustrated). The conductor 655 is electrically connected to the semiconductor layer 638 in the corresponding one memory pillar 634 for each of the string units SU.

More specifically, in each of the string units SU, the contact plug CP is provided on the semiconductor layer 638 in each of the memory pillars 634, and the one conductor 655 is provided on the contact plug CP, for example. Note that the present invention is not limited to such a configuration and the semiconductor layer 638 in the memory pillar 634 and the conductor 655 may be connected to each other via a plurality of contacts and wirings.

The conductor 656 is provided on a higher layer than the layer provided with the conductor 655 via an interlayer insulating film. The conductor 657 is provided in a higher layer than the layer provided with the conductor 656 via an interlayer insulating film.

The conductors 656 and 657 each correspond to a wiring for connecting a wiring provided in the memory cell array 23 and a peripheral circuit provided under the memory cell array 23 to each other, for example. The conductors 656 and 657 may be connected to each other by a columnar contact not illustrated. Here, the layer provided with the conductor 655 is referred to a wiring layer M0, the layer provided with the conductor 656 is referred to as a wiring layer M1, and the layer provided with the conductor 657 is referred to as a wiring layer M2.

As illustrated in FIG. 4, in the semiconductor storage device according to the embodiment, the wiring layers D0, D1, and D2 are formed in a lower layer than the string unit SU. The wiring layers M0, M1, and M2 are formed in a higher layer than the string unit SU. An example of the wiring layers D0, D1, and D2 is a tungsten wiring formed by a damascene method.

An example of the wiring layer M2 is an aluminum wiring formed by anisotropic etching such as reactive ion etching (RIE). The wiring layer M2 has a large film thickness and has a low resistance, and is thus assigned a main power source wiring (VCC, VSS). An example of the wiring layer M1 is a copper (Cu) wiring formed by a damascene method. Since the Cu wiring is high in wiring reliability such as EM (electromigration) resistance, the wiring layer M1 is reliably assigned a signal line through which data needs to be transmitted. An example of the wiring layer M0 is a Cu wiring formed by a damascene method. The wiring layer M0 is assigned a part of the main power source wiring for the purpose of intensifying a power source in addition to being used as a bit line BL. Note that a wiring other than the main power source wiring, such as a signal line, also preferably has as low a resistance as possible and is thus formed using as high a wiring layer as possible (e.g., the wiring layer M2).

(Configuration of Row Decoder)

Figure 5:
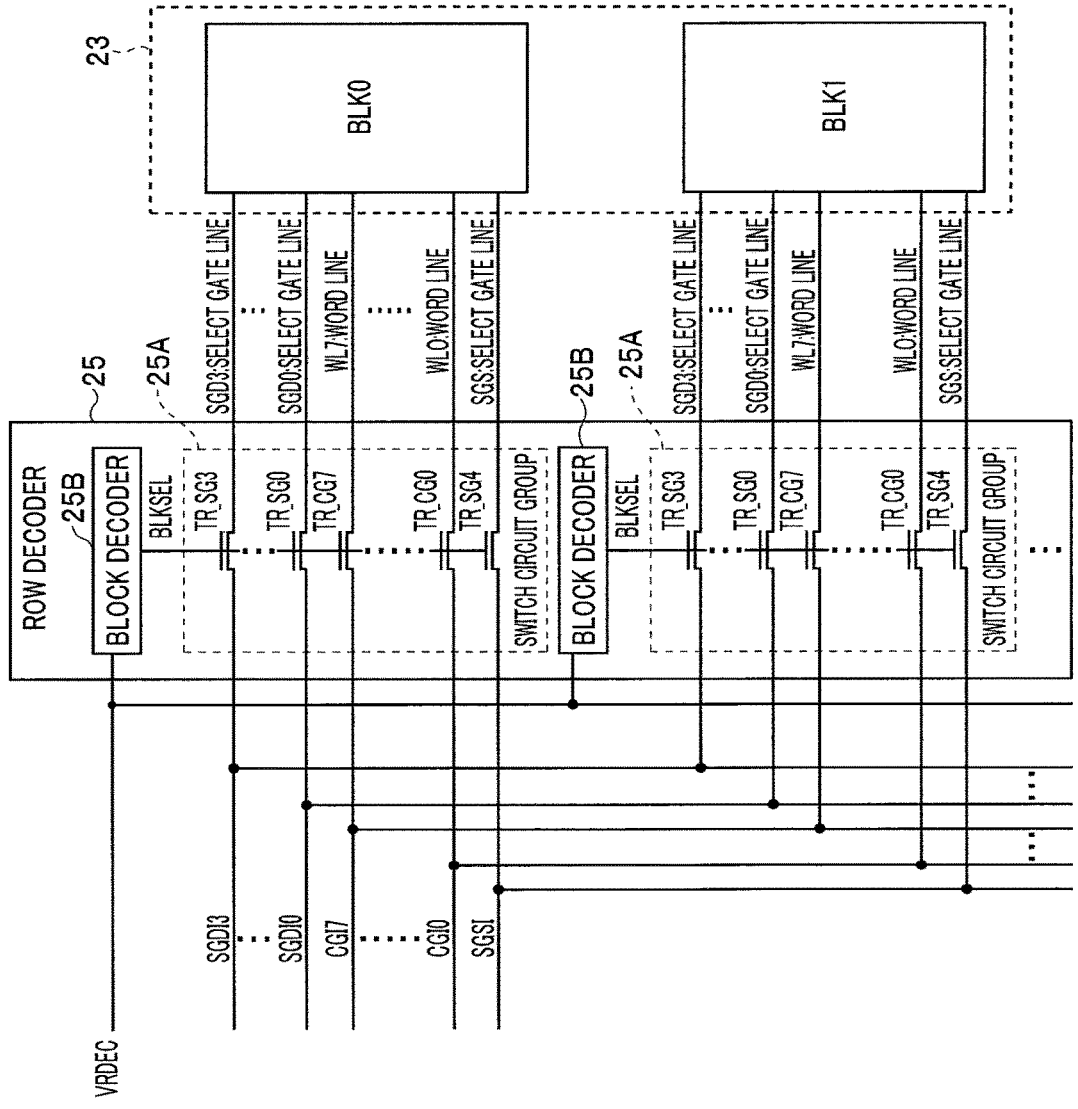
FIG. 5 is a block diagram illustrating an example of a row decoder 25 illustrated in FIG. 2.

FIG. 5 is a block diagram illustrating an example of the row decoder 25 illustrated in FIG. 2. Although FIG. 5 illustrates only a circuit for a block BLK0 and a circuit for a block BLK1 in the row decoder 25, a circuit for the other block has a similar circuit configuration to circuit configurations of the circuits.

Various types of voltages from the voltage supply circuit 28 are supplied to the row decoder 25 via a signal line SGSI, signal lines CGI0 to CGI7 (hereinafter representatively referred to as signal lines CGI), and signal lines SGDI0 to SGDI3 (hereinafter representatively referred to as signal lines SGDI). The voltage supply circuit 28 generates various types of voltages required for a writing operation, a reading operation, and an erasing operation. For example, the voltage supply circuit 28 generates a program voltage VPGM, a voltage VPGMH higher than the program voltage VPGM, an erase voltage VERA, and the like. The negative voltage generation circuit 28a in the voltage supply circuit 28 converts a ground voltage VSS into a negative voltage VBB and outputs the negative voltage VBB. Note that although only a signal line SGSI of a single system is illustrated in FIG. 5, signal lines SGSI of a plurality of systems may also be adopted.

The signal lines SGSI, SGDI, and CGI are respectively branched by the row decoder 25 and connected to wirings (the wirings are hereinafter representatively referred to as signal lines CG) in each of the blocks BLK. In other words, the signal lines SGDI0 to SGDI3 each function as a global drain-side select gate line, and are respectively connected to the select gate lines SGD0 to SGD3 as local signal lines CG in each of the blocks BLK via the row decoder 25. The signal lines CGI0 to CGI7 each function as a global word line, and are respectively connected to the word lines WL0 to WL7 as local signal lines CG in each of the blocks BLK via the row decoder 25. The word lines WL0 to WL7 and the word lines WL0 to WL7 in the different blocks are physically spaced apart from each other. In other words, the word line WL0 in the block BLK0 and the word line WL0 in the block BLK1 are physically spaced apart from each other. The signal line SGSI functions as a global source-side select gate line, and is connected to the select gate line SGS as a local signal line CG in each of the blocks BLK via the row decoder 25.

Note that when the select gate lines SGS0, SGS1, . . . of a plurality of systems are adopted, signal lines SGSI0, SGSI1, . . . of a plurality of systems (the signal lines are also hereinafter representatively referred to as signal lines SGSI) are respectively provided to correspond to the select gate lines.

The row decoder 25 is controlled by the sequencer 27, to respectively supply various types of voltages generated by the voltage supply circuit 28 to the corresponding signal lines SGDI0 to SGDI3, SGSI, and CGI0 to CGI7. For example, the row decoder 25 supplies a voltage VISO to each of the word lines WL and supplies the erase voltage VERA to the signal line SGS at the time of the erasing operation.

The row decoder 25 includes a plurality of switch circuit groups 25A respectively corresponding to the blocks and a plurality of block decoders 25B provided to respectively correspond to the plurality of switch circuit groups 25A. Each of the switch circuit groups 25A includes a plurality of transistors TR_SG0 to TR_SG3 that respectively connect the signal lines SGDI0 to SGDI3 and the select gate lines SGD0 to SGD3 to each other, a plurality of transistors TR_CG0 to TR_CG7 that respectively connect the signal lines CGI0 to CGI7 and the word lines WL0 to WL7 to each other, and a transistor TR_SG4 that connects the signal line SGSI and the select gate line SGS to each other. The transistors TR_SG0 to TR_SG4 and TR_CG0 to TR_CG7 (the transistors are hereinafter referred to as transistors TR when not required to be distinguished) each functioning as a word line switch are each a high-withstand voltage transistor.

Each of the block decoders 25B supplies a block selection signal BLKSEL to respective gates of the transistors TR_SG0 to TR_SG4 and the transistors TR_CG0 to TR_CG7 when itself designated by a row address. As a result, in the switch circuit group 25A to which a block selection signal BLKSEL is supplied from the block decoder 25B to be designated by the row address, the transistors TR_SG0 to TR_SG4 and the transistors TR_CG0 to TR_CG7 are turned on and rendered conductive. Accordingly, voltages to be supplied to the signal lines SGDI0 to SGDI3, the signal line SGSI, and the signal lines CGI0 to CGI7 from the power source generation circuit 28 are respectively supplied to the select gate lines SGD0 to SGD3, the select gate line SGS, and the word lines WL0 to WL7 included in the block BLK as an operation target.

In other words, the word line switch including each of the transistors TR has a function of supplying a voltage required for an operation to the signal line CG required for the operation and blocking a voltage to the signal line CG not required for the operation. Thus, the word line switch is provided for each of the signal lines CG. A required number of word line switches increases as a recording density is improved. Moreover, the word line switch handles a relatively high voltage.

Accordingly, an occupied area of the word line switches configured in the row decoder 25 is significantly large.

(Configuration of Switch Circuit Group in Comparative Example)

Figure 6:
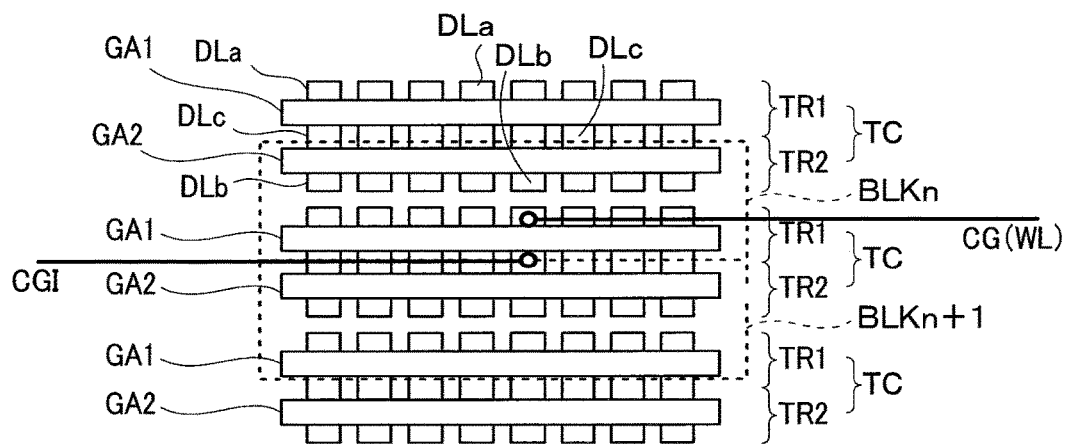
FIG. 6 is an explanatory diagram illustrating a configuration of a switch circuit group in a comparative example.
Figure 7:
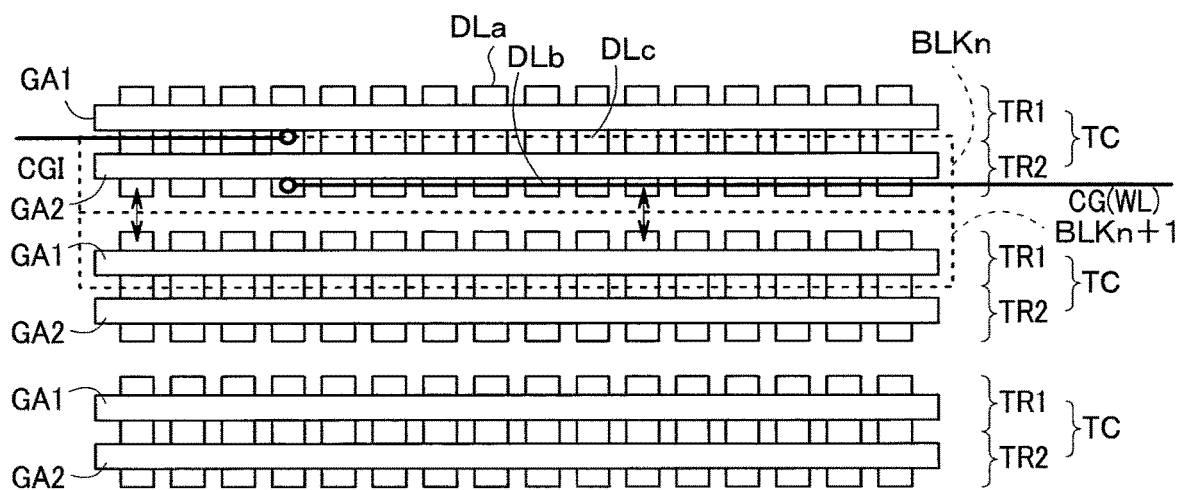
FIG. 7 is an explanatory diagram illustrating a configuration of a switch circuit group in the comparative example.

FIGS. 6 and 7 are explanatory diagrams each illustrating a configuration of a switch circuit group in a comparative example.

In FIG. 6, each of word line switches in a switch circuit group includes a plurality of transistors TR1 respectively including a plurality of diffusion layers DLa and a plurality of diffusion layers DLc and a common gate GA1 arranged between the plurality of diffusion layers DLa and the plurality of diffusion layers DLc, or includes a plurality of transistors TR2 respectively including a plurality of diffusion layers DLb and the plurality of diffusion layers DLc and a common gate GA2 arranged between the plurality of diffusion layers DLb and the plurality of diffusion layers DLc. Note that in the following description, a circuit group including the transistors TR1 including the common gate GA1 and the transistors TR2 including the common gate GA2 is referred to as a transistor circuit group TC. In other words, FIG. 6 illustrates an example in which transistor circuit groups TC each configured by arranging eight transistors TR1 and eight transistors TR2 sharing common diffusion layers DLc in a longitudinal direction of gates GA1 and GA2 (hereinafter referred to as a gate longitudinal direction) are provided in three rows. Note that there are provided in practice transistors TR1 and transistors TR2 the respective numbers of which correspond to the number of signal lines CG.

Note that a space between the transistor circuit groups TC is a device isolation region formed by an STI (shallow trench isolation), that is, an insulating film.

The diffusion layers DLc shared by the transistors TR1 and the transistors TR2 are respectively connected to signal lines CGI. The diffusion layers DLa in the transistors TR1 and the diffusion layers DLb in the transistors TR2 are respectively connected to the signal lines CG.

A voltage from the signal line CGI is supplied to the diffusion layer DLc shared by the transistor TR1 and the transistor TR2. When the transistor TR1 is turned on in response to a block selection signal BLKSEL to be supplied to the gate GA1, the voltage from the signal line CGI is supplied to the signal line CG connected to the diffusion layer DLa in the transistor TR1. When the transistor TR2 is turned on in response to a block selection signal BLKSEL to be supplied to the gate GA2, the voltage from the signal line CGI is supplied to the signal line CG connected to the diffusion layer DLb in the transistor TR2.

A broken line in FIG. 6 represents a boundary between blocks BLK, i.e., a boundary between the word line switches in a switch circuit group 25A corresponding to the same block. In other words, FIG. 6 illustrates an example in which transistors TR1 and transistors TR2 in each of transistor circuit groups TC respectively belong to different two blocks. For example, out of a transistor TR1 and a transistor TR2 sharing a diffusion layer DLc indicated by a white circle illustrated in FIG. 6, the transistor TR1 supplies a voltage to a memory cell transistor MT belonging to a block BLKn, and the transistor TR2 supplies a voltage to a memory cell transistor MT belonging to a block BLKn+1.

Thus, the voltage inputted to the common diffusion layers DLc can be supplied to respective word lines WL in different blocks.

FIG. 7 illustrates an example in which a boundary between blocks BLK differs from the boundary illustrated in FIG. 6.

In the example illustrated in FIG. 7, each of word line switches in a switch circuit group also has a similar configuration to the configuration in the example illustrated in FIG. 6, and includes a plurality of transistors TR1 respectively including a plurality of diffusion layers DLa and a plurality of diffusion layers DLc and a gate GA1 arranged between the plurality of diffusion layers DLa and the plurality of diffusion layers DLc, or includes a plurality of transistors TR2 respectively including a plurality of diffusion layers DLb and the plurality of diffusion layers DLc and a gate GA2 arranged between the plurality of diffusion layers DLb and the plurality of diffusion layers DLc. Note that although FIG. 7 illustrates an example in which transistor circuit groups TC each configured by arranging 16 transistors TR1 and 16 transistors TR2 sharing common diffusion layers DLc are provided in three rows, there are provided in practice transistors TR1 and transistors TR2 the respective numbers of which correspond to the number of signal lines CG.

Note that a device isolation region is formed by an STI between the transistor circuit groups TC.

In the example illustrated in FIG. 7, a boundary between blocks exists between the diffusion layer DLa and the diffusion layer DLb. For example, a voltage inputted to a diffusion layer DLc belonging to a block BLKn indicated by a white circle illustrated in FIG. 7 is supplied to a word line WL in the block BLKn, and the voltage inputted to the diffusion layer DLc belonging to the block BLKn is supplied to a word line belonging to a block BLKn+1 adjacent to the block BLKn.

(Erasing Operation)

Figure 8:
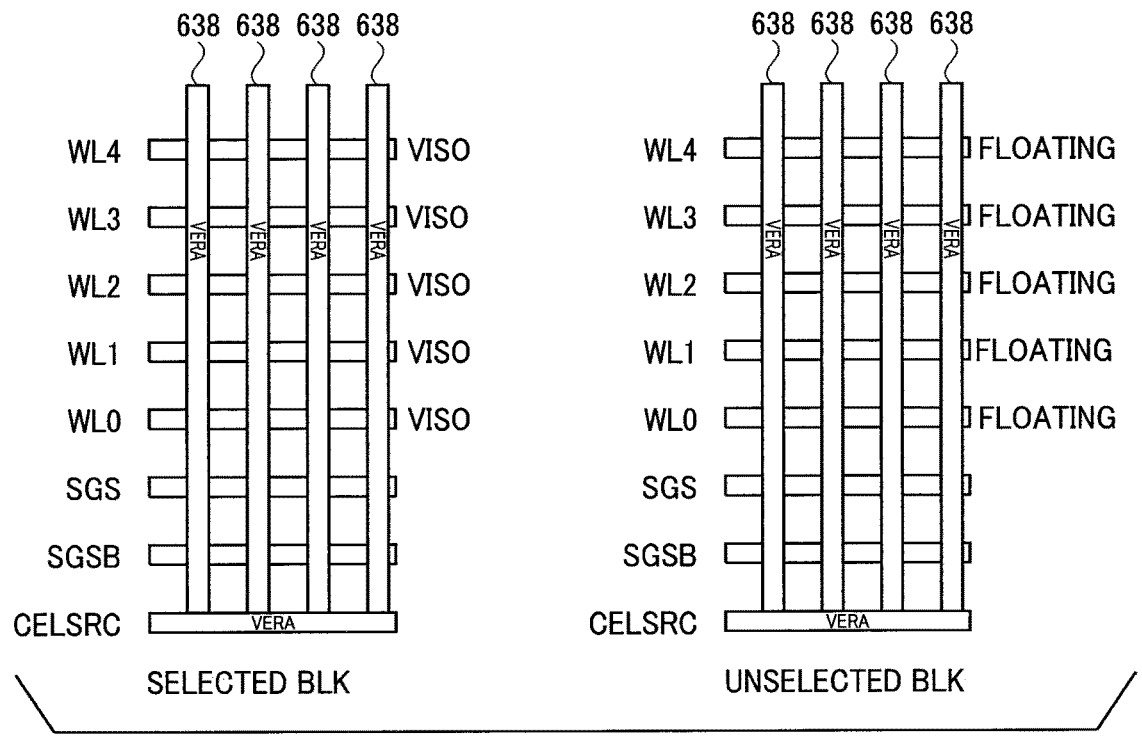
FIG. 8 is an explanatory diagram for describing an erasing operation.
Figure 9:
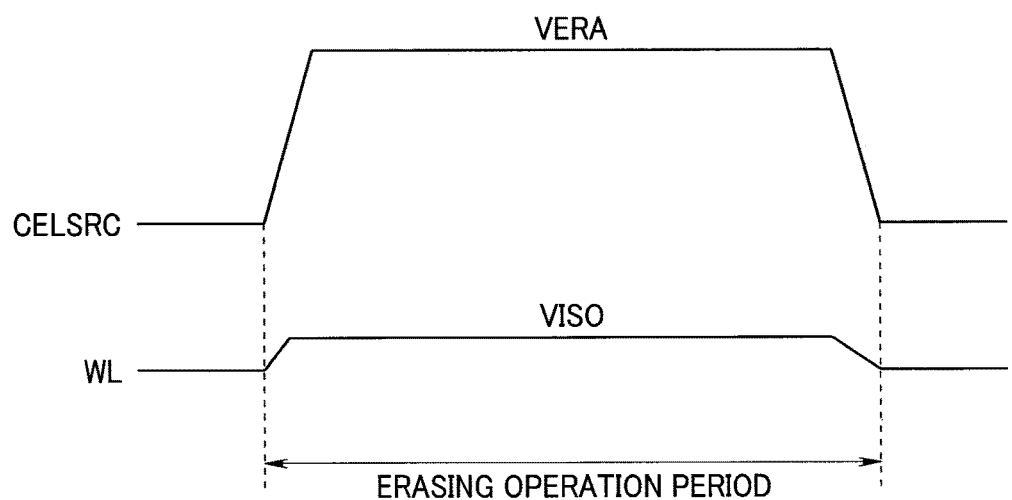
FIG. 9 is a waveform diagram illustrating an erase voltage VERA and a voltage VISO.

FIG. 8 is an explanatory diagram for describing an erasing operation. The left side in FIG. 8 illustrates a state of a selected BLK, and the right side in FIG. 8 illustrates a state of an unselected BLK. FIG. 9 is a waveform diagram illustrating an erase voltage VERA and a voltage VISO.

In the erasing operation, erasure is performed in units of blocks, as described above. As illustrated in FIG. 8, the erase voltage VERA illustrated in FIG. 9 is supplied to a source line CELSRC for erasure. For the selected block (selected BLK) as an erasure target, the voltage VISO (FIG. 9) is supplied to a word line WL. For the unselected block (unselected BLK) not as an erasure target, a word line WL is in a floating state.

The erase voltage VERA is supplied to the source line CELSRC, whereby a voltage of a channel region including the semiconductor layer 638 in the memory pillar 634 is a voltage VERA (e.g., 23 volts). In the selected BLK, 0.5 volts, for example, is supplied as a voltage VISO to the word line WL, and an erasing operation for erasing data stored in the memory cell transistor MT is performed based on a relatively large voltage difference between the erase voltage VERA and the voltage VISO. In the unselected BLK, the word line WL is in a floating state, and a voltage of the word line WL rises to the vicinity of the erase voltage VERA by capacitive coupling. As a result, in the unselected BLK, a difference between the voltage of the channel region and the voltage of the word line WL is small, whereby erasure is not performed.

More specifically, at the time of the erasing operation, the voltage VISO (e.g., 0.5 volts) to be supplied to the word line WL in the selected block is applied from the voltage supply circuit 28 to the signal line CGI. In the example illustrated in FIG. 6, a voltage VISO to be supplied to the diffusion layer DLc indicated by a round mark, for example, is supplied to the word line WL in the block BLKn as the selected BLK connected to the diffusion layer DLa indicated by a round mark when the transistor TR1 is turned on in response to the block selection signal BLKSEL to be supplied to the gate GA1. For the block BLKn+1 as the unselected BLK adjacent to the block BLKn, the transistor TR2 is turned off, whereby the voltage VISO supplied to the diffusion layer DLc indicated by the round mark is not supplied to the word line WL, and the word line WL enters a floating state.

In the example illustrated in FIG. 7, when the block BLKn is a selected BLK, the transistor TR2 in the block BLKn is turned on, whereby a voltage VISO to be supplied to the diffusion layer DLc is supplied to the word line WL in the block BLKn. The block BLKn+1 adjacent to the block BLKn is an unselected BLK, and the transistor TR1 is off. Therefore, a voltage VISO is not supplied to the word line WL belonging to the block BLKn+1, and the word line WL enters a floating state. In other words, the word line in the unselected BLK at the time of the erasing operation rises to an erase voltage VERA.

In other words, in the example illustrated in FIG. 7, a voltage VISO is applied to the diffusion layer DLb in the transistor TR2 in the block BLKn, and the erase voltage VERA is applied to the diffusion layer DLa in the transistor TR1 in the adjacent block BLKn+1. A relatively large voltage is applied with a device isolation region sandwiched between the adjacent diffusion layers DLb and DLa, whereby a leak current may be generated in the substrate. To prevent the leak current from being thus generated, a dummy gate for device isolation (a first wiring) is arranged on a substrate surface of the device isolation region in the comparative example. A ground voltage VSS is applied to the dummy gate, and a width of the device isolation region in a direction perpendicular to a gate longitudinal direction (a distance between the adjacent diffusion layers DLb and DLa) is sufficiently increased. Note that in the example illustrated in FIG. 6, substantially the same voltages VERA are respectively applied to both the diffusion layers DLb and DLa that are adjacent to each other to sandwich the device isolation region, thereby presenting no particular problem.

Figure 10:
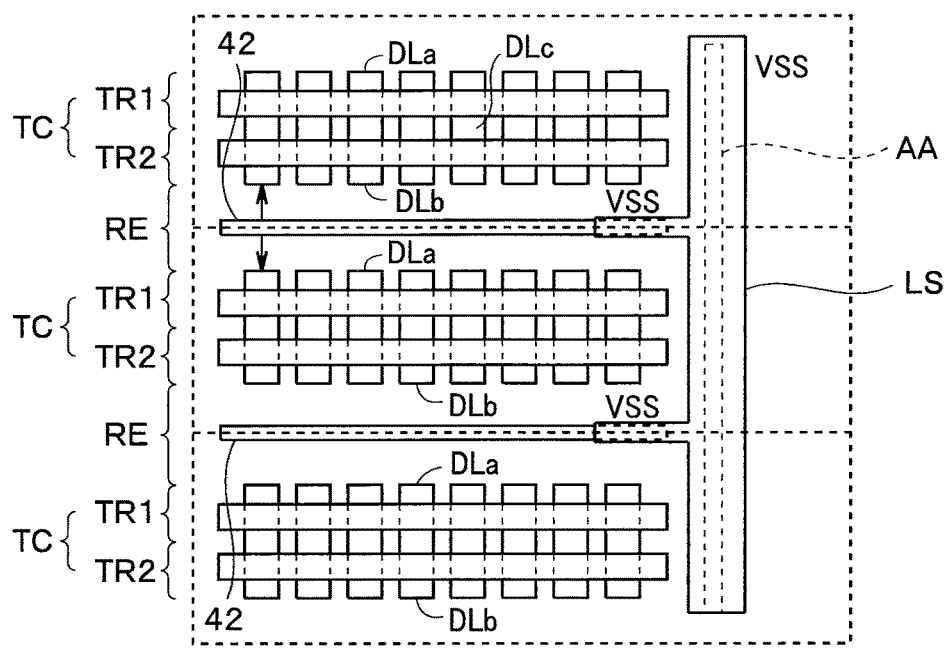
FIG. 10 is an explanatory diagram illustrating a planar shape in the comparative example.
Figure 11:
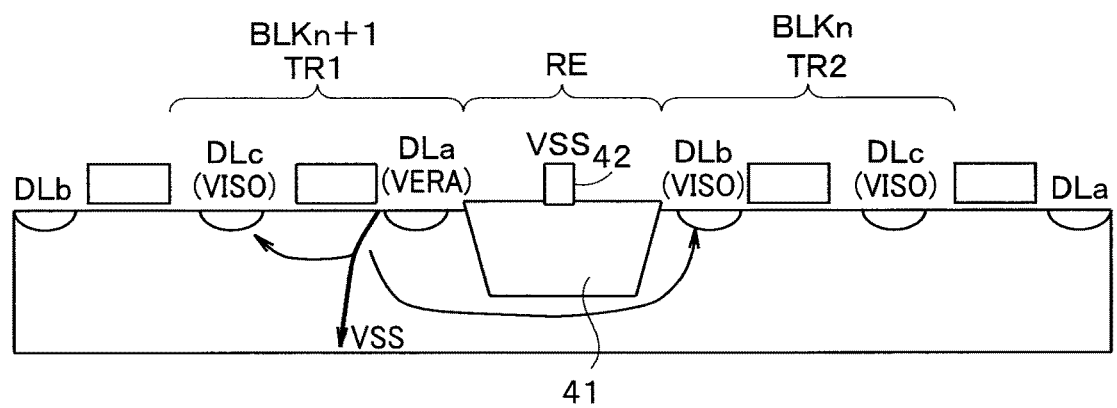
FIG. 11 is an explanatory diagram schematically illustrating a cross section of a substrate in the comparative example.

FIG. 10 is an explanatory diagram illustrating a planar shape in the comparative example, and FIG. 11 is an explanatory diagram schematically illustrating a cross section of a substrate in the comparative example.

In a switch circuit group in the comparative example illustrated in FIG. 10, a configuration of a transistor circuit group TC including transistors TR1 and transistors TR2 respectively included in word line switches is similar to the configuration illustrated in FIGS. 6 and 7. FIG. 10 illustrates a device isolation dummy gate 42 (a first wiring) omitted in FIGS. 6 and 7. In an example illustrated in FIG. 10, the device isolation dummy gate 42 is formed on a substrate surface of a device isolation region RE between a diffusion layer DLb and a diffusion layer DLa. A ground voltage VSS is applied to the device isolation dummy gate 42 from a VSS wiring LS (a first wiring) via a contact not illustrated. Note that the VSS wiring LS is provided on an active region AA of the substrate. The active region is a region where a p-type or n-type semiconductor layer is formed.

FIG. 11 illustrates a cross section of a device isolation region RE and transistors TR1 and TR2 adjacent to the device isolation region RE in the comparative example illustrated in FIG. 10. The device isolation region RE is formed by an STI 41, and a device isolation dummy gate 42 is provided on the STI 41. A ground voltage VSS is supplied to the device isolation dummy gate 42 by a VSS wiring LS. The transistors TR2 and TR1 are respectively formed on both sides of the device isolation region RE. The STI is formed by embedding an insulating layer such as a silicon oxide film or a silicon nitride film. The dummy gate 42 may be formed of polycrystalline silicon. The dummy gate 42 may be formed simultaneously with respective gates of the transistors TR1 and TR2.

FIG. 11 illustrates an example in which a device isolation region RE is formed at a boundary between a transistor TR2 in a block BLKn as a selected BLK and a transistor TR1 in a block BLKn+1 as an unselected BLK, like FIG. 7. A voltage VISO is supplied to a diffusion layer DLc in the block BLKn, whereby a voltage VISO appears in a diffusion layer DLb. The transistor TR1 in the block BLKn+1 as the unselected BLK is off. Accordingly, a voltage of a word line WL in a floating state is VERA, and the voltage VERA is applied to a diffusion layer DLa. As described above, as a result of a relatively large voltage being applied between the adjacent diffusion layers DLa and DLb, a leak current that passes below the STI 41 may be generated in the device isolation region RE, as indicated by an arrow in FIG. 11. For this reason, a width of the device isolation region RE (a distance between the adjacent diffusion layers DLb and DLa) is increased in the comparative example. This prevents a leak current from being generated in a substrate between the diffusion layers DLa and DLb that are adjacent to each other to sandwich the device isolation region RE. The width of the device isolation region RE is large.

Accordingly, in the comparative example, an occupied area of a switch circuit group increases, thereby making it difficult to reduce a chip area.

Although the voltage VERA is applied to the diffusion layer DLa in the unselected BLK in the foregoing description, a higher voltage than the voltage VERA is applied to the diffusion layer DLa due to a creep-up phenomenon.

Figure 12:
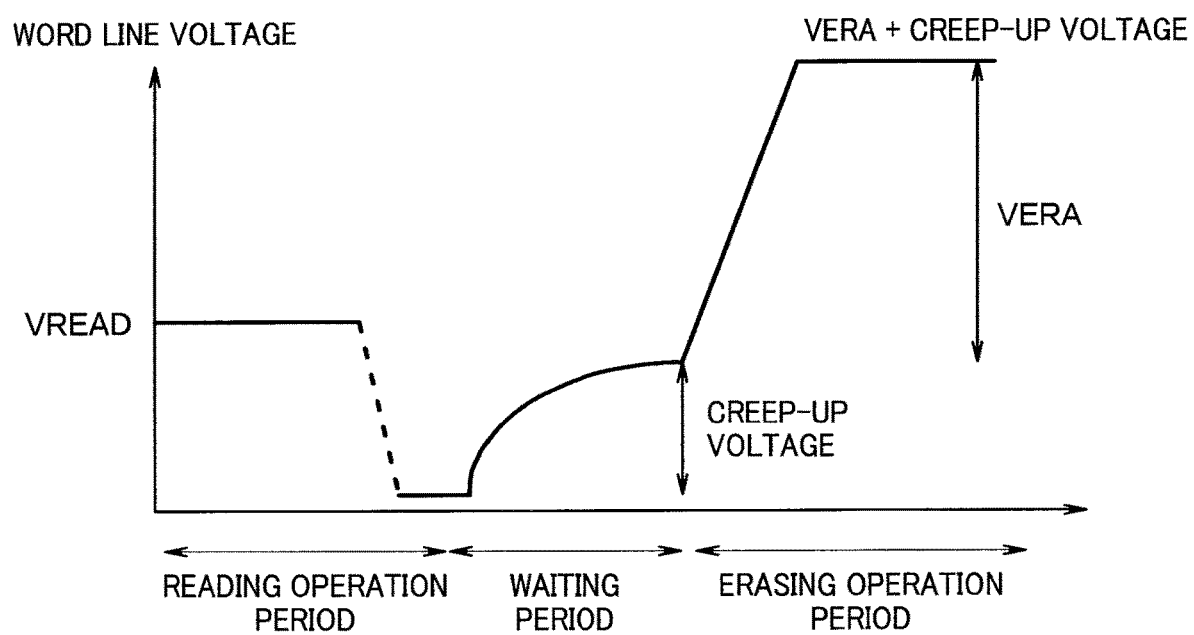
FIG. 12 is a waveform diagram for describing a creep-up phenomenon.

FIG. 12 is a waveform diagram for describing the creep-up phenomenon. FIG. 12 illustrates respective changes in voltages of a word line WL in a reading operation period, a waiting period, and an erasing operation period with a time along a horizontal axis and a voltage of the word line WL along a vertical axis.

In the unselected BLK, a predetermined read voltage VREAD is applied to the word line WL during the reading operation period. Note that a voltage of a channel region is a ground voltage VSS. When a reading operation ends, the voltage of the word line WL decreases to a ground voltage VSS.

At this time, a potential of the channel region decreases to a negative potential by capacitive coupling between the word line WL and the channel region. Then, a charge in the channel region is gradually drained off to a substrate and/or a bit line BL by a leak current, and the potential of the channel region returns to the ground voltage VSS (0 volts). When the potential of the channel region returns to the ground voltage VSS, the word line WL capacitively coupled to the channel region rises to a creep-up voltage. In FIG. 12, the rise in the voltage of the word line WL in the waiting period represents the creep-up phenomenon.

When an erase voltage VERA from a signal line CGI is supplied to the word line WL via a switch circuit group 25A after the waiting period, the erase voltage VERA is further applied to the word line WL crept up, and the voltage of the word line WL is (the erase voltage VERA+the creep-up voltage).

As a result of the creep-up phenomenon, a voltage difference between the diffusion layers DLa and DLb that are adjacent to each other to sandwich the device isolation region RE further increases, whereby a leak current is easily generated. Considering the creep-up phenomenon, the width of the device isolation region RE needs to be further increased, thereby making it more difficult to reduce a chip area.

The present embodiment proposes a configuration of a switch circuit group 25A capable of reducing a width of a device isolation region while preventing a leak current between diffusion layers DLa and DLb that are adjacent to each other to sandwich the device isolation region.

(Configuration of Switch Circuit Group 25A)

Figure 13:
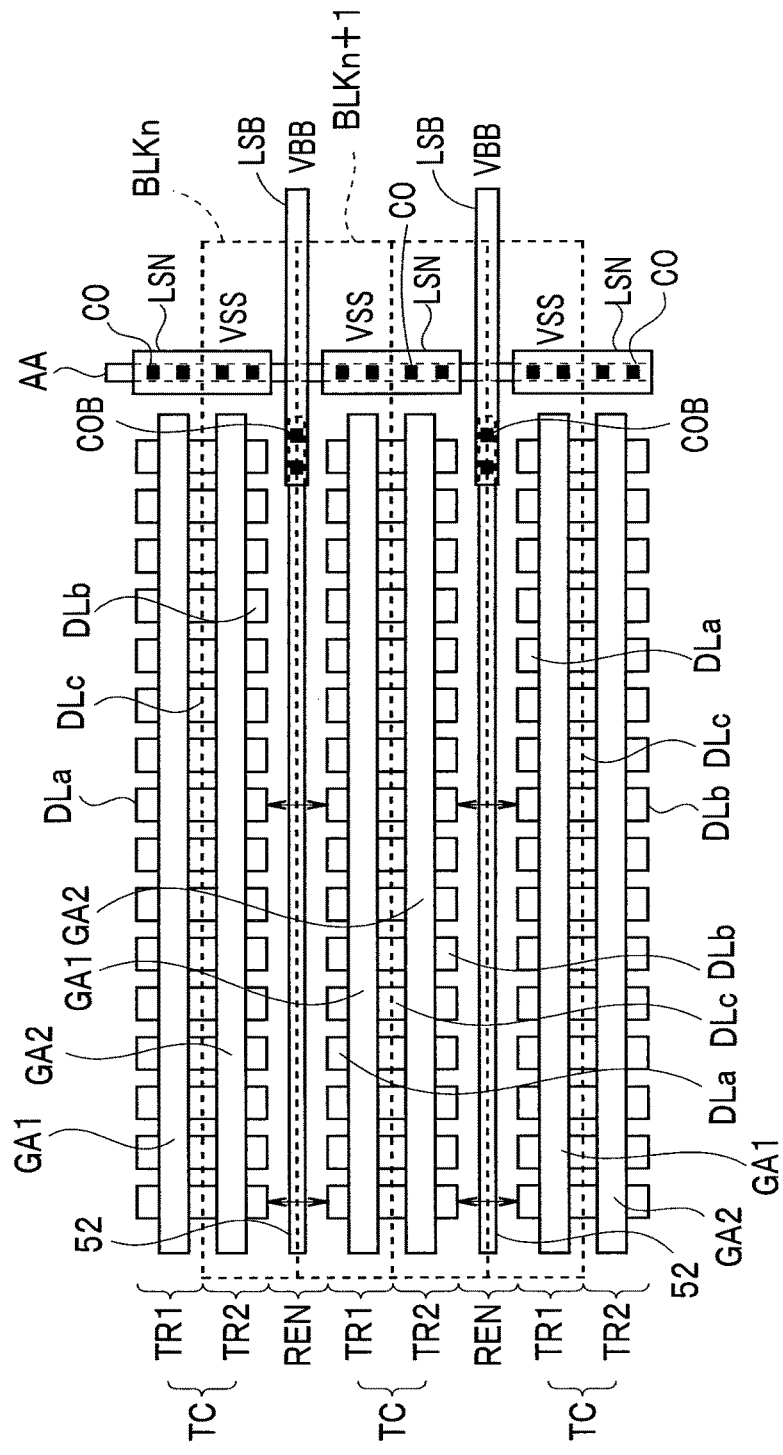
FIG. 13 is an explanatory diagram for describing a planar layout of a switch circuit group 25A.
Figure 14:
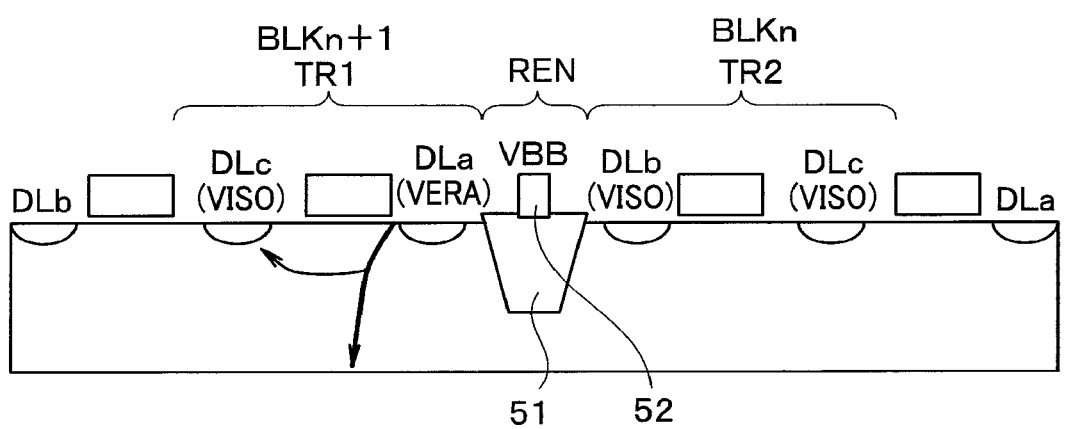
FIG. 14 is an explanatory diagram schematically illustrating a cross section of a substrate of the switch circuit group 25A.

FIG. 13 is an explanatory diagram for describing a planar layout of a switch circuit group 25A. The same components as the components illustrated in FIGS. 6 and 7 are assigned the same reference numerals, and hence overlapping description of the components is not repeated in FIG. 13. FIG. 14 is an explanatory diagram schematically illustrating a cross section of a substrate of the switch circuit group 25A.

A word line switch in the switch circuit group 25A illustrated in FIG. 13 has a similar configuration to the configuration in the example illustrated in FIGS. 6 and 7, and includes a plurality of transistors TR1 respectively including a plurality of diffusion layers DLa and a plurality of diffusion layers DLc and a gate GA1 arranged between the plurality of diffusion layers DLa and the plurality of diffusion layers DLc, or includes a plurality of transistors TR2 respectively including a plurality of diffusion layers DLb and the plurality of diffusion layers DLc and a gate GA2 arranged between the plurality of diffusion layers DLb and the plurality of diffusion layers DLc. Note that although FIG. 13 illustrates an example in which transistor circuit groups TC each configured by arranging 16 transistors TR1 and 16 transistors TR2 sharing common diffusion layers DLc are provided in three rows, there are provided in practice transistors TR1 and transistors TR2 the respective numbers of which correspond to the number of signal lines CG.

In the switch circuit group 25A according to the present embodiment, a device isolation region REN is provided between the transistor circuit groups TC. A width of the device isolation region REN (a distance between the adjacent diffusion layers DLb and DLa) is smaller than the width of the device isolation region RE illustrated in FIG. 10.

A device isolation dummy gate 52 (a first wiring) is formed on a substrate surface of the device isolation region REN in the present embodiment, and a negative voltage VBB is supplied to the device isolation dummy gate 52. The negative voltage VBB is generated by a negative voltage generation circuit 28a, and is transmitted to wiring layers D0 and D1, for example, through a contact not illustrated via wiring layers M1 and M2, for example.

In FIG. 13, wirings such as the wiring layers D0 and D1 to which the negative voltage VBB is transmitted are each referred to as a wiring LSB (a first wiring). Note that a ground voltage VSS is also transmitted to the wiring layers D0 and D1, for example, through a contact not illustrated via the wiring layers M1 and M2, for example. In FIG. 13, the wirings such as the wiring layers D0 and D1 to which the ground voltage VSS is transmitted are each referred to as a VSS wiring LSN (a second wiring).

The device isolation dummy gate 52 is provided to extend in a direction parallel to a gate longitudinal direction and between the plurality of diffusion layers DLc and the plurality of diffusion layers DLa in a planar manner. In an end portion of the device isolation dummy gate 52, the wiring LSB provided to extend in the gate longitudinal direction and the device isolation dummy gate 52 are electrically connected to each other via a contact COB (a first wiring). As a result, the negative voltage VBB is supplied to the device isolation dummy gate 52.

In the vicinity of at least one side of an arrangement region of the switch circuit group 25A, an active region AA provided to extend along the one side of the arrangement region is formed on the substrate surface. In an example illustrated in FIG. 13, an extension direction of the active region AA is a direction perpendicular to the gate longitudinal direction. A plurality of VSS wirings LSN are formed in a separated manner above the active region AA. Each of the VSS wirings LSN is connected to the active region AA by a contact CO (a second wiring). As a result, the ground voltage VSS is supplied to the active region AA.

The wiring LSB and the VSS wiring LSN are perpendicular to each other above the active region AA. In the example illustrated in FIG. 13, the wiring LSB and the VSS wiring LSN are respectively wirings provided on the same wiring layer, for example, and are brought into electrical noncontact with each other because the VSS wiring LSN is separated at a location intersecting the wiring LSB. Note that the VSS wiring LSN and the wiring LSB may be provided in any wiring layer if brought into electrical noncontact with each other.

As a result of the negative voltage VBB being supplied to the device isolation dummy gate 52, even when a relatively high voltage is applied between the diffusion layers DLb and DLa that are adjacent to each other to sandwich the device isolation region REN, a leak current can be prevented from flowing in a substrate below an STI 51 between the diffusion layers DLb and DLa. In other words, it is possible to make a width of the device isolation region REN relatively small while preventing a leak current from being generated.

FIG. 14 illustrates a cross section of a device isolation region REN and transistors TR1 and TR2 adjacent to the device isolation region REN. The device isolation region REN is formed by an STI 51, and a negative voltage VBB is supplied to a device isolation dummy gate 52 on the STI 51. The STI 51 is formed by embedding an insulating layer such as a silicon oxide film or a silicon nitride film. The transistors TR2 and TR1 are formed on both sides to sandwich the device isolation region REN.

In FIG. 14, when a boundary between blocks BLK matches a location of the device isolation region REN, a voltage VISO is also supplied to a diffusion layer DLc in a block BLKn as a selected BLK, whereby a voltage VISO appears in a diffusion layer DLb. A transistor TR1 in a block BLKn+1 as an unselected BLK is off. Accordingly, a voltage of a word line WL in a floating state is VERA (+a creep-up voltage), and the voltage is applied to a diffusion layer DLa. As a result of a relatively large voltage being applied between the adjacent diffusion layers DLa and DLb, a leak current that passes through the device isolation region REN is easily generated.

However, in the present embodiment, the negative voltage VBB is supplied to the device isolation dummy gate 52 formed on the STI 51 in the device isolation region REN, thereby making it possible to prevent a leak current between the diffusion layers DLa and DLb that are adjacent to each other to sandwich the device isolation region REN from being generated. In the present embodiment, as a voltage to be applied to the device isolation dummy gate 52, a voltage that is less than a ground voltage but more than 0 volts may be supplied.

As a result, even when a width of the device isolation region REN is sufficiently reduced, as illustrated in FIG. 14, a leak can be prevented from occurring. As a result, an occupied area of a switch circuit group 25A can be reduced. For example, in FIG. 11 in the comparative example, 400 nm has been required as a depth of a deepest portion of the device isolation region REN, and 1200 nm has been required as a width of the device isolation region REN in a direction perpendicular to a gate longitudinal direction. However, in the present embodiment, even if a depth of a deepest portion of the device isolation region REN is 400 nm and a width of the device isolation region REN in a direction perpendicular to a gate longitudinal direction is 600 nm, the leak current can be prevented from being generated. The width of the device isolation region REN may be 1000 nm or less to 600 nm or more. The width of the device isolation region REN may be smaller and 300 nm or more and less than 600 nm. The depth of the deepest portion of the device isolation region REN may be 100 nm or more and less than 200 nm. The depth of the deepest portion of the device isolation region REN may be 200 nm or more and 300 nm or less. When the depth of the device isolation region is reduced, the cost can be reduced during manufacturing.

In the present embodiment, the negative voltage VBB is thus supplied to the dummy gate of the device isolation region, thereby making it possible to reduce the occupied area of the switch circuit group to reduce the chip area by reducing the width of the device isolation region without generating the leak current.

Second Embodiment

Figure 15:
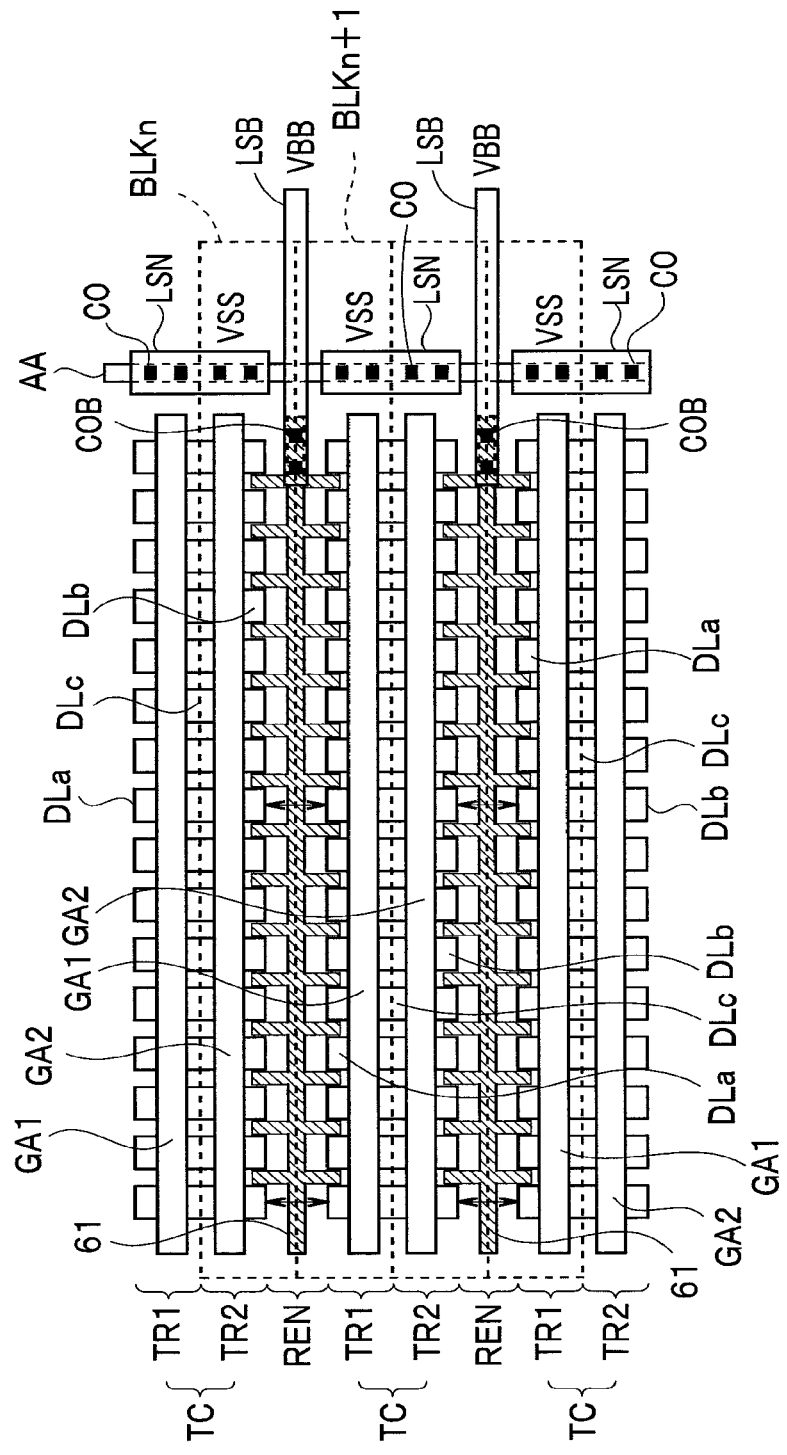
FIG. 15 is an explanatory diagram illustrating a second embodiment.

FIG. 15 is an explanatory diagram illustrating a second embodiment. The same components as the components illustrated in FIG. 13 are respectively assigned the same reference numerals, and hence description of the components is not repeated in FIG. 15. In the present embodiment, a device isolation dummy gate 61 is adopted instead of the device isolation dummy gate 52.

The device isolation dummy gate 61 (a hatched portion illustrated in FIG. 15) differs from the device isolation dummy gate 52 illustrated in FIG. 13 in an arrangement region on a device isolation region REN. In other words, the device isolation dummy gate 61 includes, on a substrate surface of the device isolation region REN, a linear-shaped portion parallel to a gate longitudinal direction between transistor circuit groups TC each configured by arranging 16 transistors TR1 and 16 transistors TR2 sharing common diffusion layers DLc and protruding-shaped portions (comb-shaped portions) perpendicular to the linear-shaped portion and respectively provided to extend among diffusion layers DLa in the transistors TR1 and diffusion layers DLb in the transistors TR2. A negative voltage VBB is supplied to the device isolation dummy gate 61 from a wiring LSB.

Other components and functions are similar to the components and functions in the first embodiment. The configuration makes it possible to prevent a leak current between the diffusion layers DLa and DLb that are adjacent to each other to sandwich the device isolation region REN from being generated. Note that the protruding-shaped portions in the device isolation dummy gate 61 make it possible to reduce a leak current at the time of a programming operation.

Thus, in the present embodiment, a similar effect to the effect in the first embodiment can also be obtained, and a leak current can also be reduced at the time of a programming operation.

Third Embodiment

Figure 16:
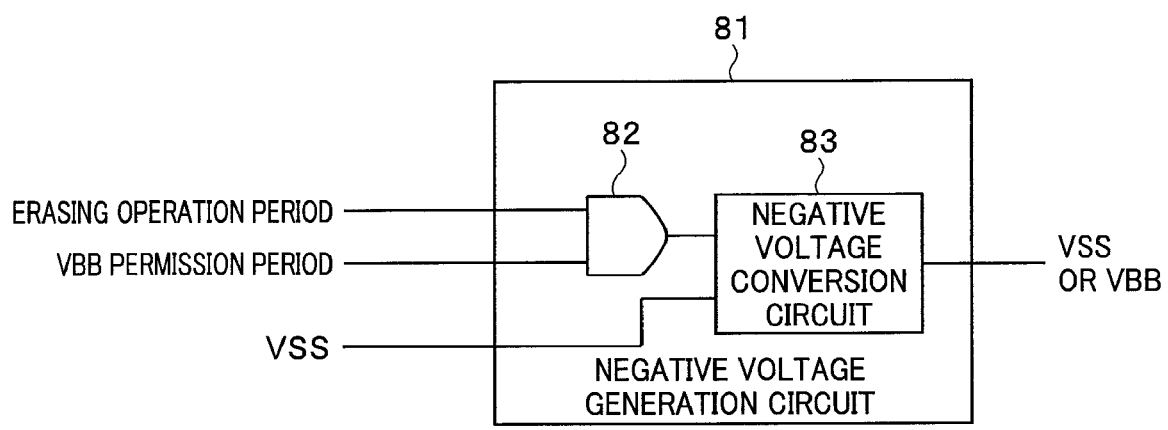
FIG. 16 is a block diagram illustrating a third embodiment.

FIG. 16 is a block diagram illustrating a third embodiment and illustrating an example of a specific configuration of a negative voltage generation circuit. Although the negative voltage VBB can be supplied to each of the dummy gates 42, 52, and 61 in the above-described embodiments, the negative voltage VBB may not necessarily be supplied at all operation timings of the nonvolatile memory 2, and the ground voltage VSS may preferably be applied to each of the dummy gates 42, 52, and 61. In the present embodiment, the ground voltage VSS and the negative voltage VBB can be switched and supplied to each of the dummy gates 42, 52, and 61.

The present embodiment differs from each of the above-described embodiments in that a negative voltage generation circuit 81 is adopted instead of the negative voltage generation circuit 28a.

The negative voltage generation circuit 81 included in a voltage supply circuit 28 includes a negative voltage conversion circuit 83 and an AND circuit 82. The ground voltage VSS is applied to the negative voltage conversion circuit 83 via a power inputting terminal group 35. An erasing operation period signal representing an erasing operation period and a VBB permission period signal representing a period during which the voltage VBB is permitted to be outputted are inputted to the AND circuit 82. The erasing operation period signal and the VBB permission period signal are supplied from a sequencer 27.

In a period other than the erasing operation period, e.g., at the time of a programming operation, not the negative voltage VBB but the ground voltage VSS may preferably be applied to each of the dummy gates 42, 52, and 61. The sequencer 27 applies the erasing operation period signal to the negative voltage generation circuit 81 to restrict a period during which the negative voltage VBB is generated. In the erasing operation period, a verifying operation, a soft programming operation, or the like may be performed. In such a period, the negative voltage VBB need not necessarily be supplied to each of the dummy gates 42, 52, and 61. The sequencer 27 applies the VBB permission period signal representing the period during which the negative voltage VBB is permitted to be generated to the negative voltage generation circuit 81 during the erasing operation period.

The AND circuit 82 outputs a signal representing a period during which the negative voltage VBB may be generated in the erasing operation period to the negative voltage conversion circuit 83 on the basis of the erasing operation period signal and the VBB permission period signal. The negative voltage conversion circuit 83 converts the supplied ground voltage VSS into the negative voltage VBB and outputs the negative voltage VBB in the period during which it is indicated that the negative voltage VBB may be generated in response to the signal from the AND circuit 82. The negative voltage conversion circuit 83 outputs the supplied ground voltage VSS as it is when it is not indicated that the negative voltage VBB may be generated in response to the signal from the AND circuit 82.

In the present embodiment thus configured, in a period during which the negative voltage VBB may preferably be supplied to each of the dummy gates 42, 52, and 61, for example, a period during which a high voltage VERA is applied to the word line WL in the erasing operation period, the negative voltage VBB can be supplied to each of the dummy gates 42, 52, and 61.

Thus, in the present embodiment, a similar effect to the effect in each of the above-described embodiments can also be obtained.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A semiconductor storage device comprising:
   a first memory cell transistor;
   a first word line connected to a gate of the first memory cell transistor;
   a second memory cell transistor;
   a second word line connected to a gate of the second memory cell transistor;
   a voltage supply circuit configured to generate a voltage corresponding to an erasing operation for the first memory cell transistor and the second memory cell transistor;
   a first word line selection transistor capable of supplying the voltage from the voltage supply circuit to the first word line;
   a second word line selection transistor capable of supplying the voltage from the voltage supply circuit to the second word line;
   an insulating film provided between the first word line selection transistor and the second word line selection transistor; and
   a first wiring having at least a part provided on the insulating film and extending in a first direction,
   wherein the voltage supply circuit is capable of supplying a first voltage lower than a ground voltage to the first wiring.

2. The semiconductor storage device according to claim 1, wherein
   the first memory cell transistor belongs to a first block, and
   the second memory cell transistor belongs to a second block.

3. The semiconductor storage device according to claim 2, wherein
   the first word line selection transistor and the second word line selection transistor are adjacent to each other, in a second direction perpendicular to the first direction, to sandwich the insulating film.

4. The semiconductor storage device according to claim 2, wherein
   a first gate line of the first word line selection transistor and a second gate line of the second word line selection transistor extend in the first direction.

5. The semiconductor storage device according to claim 1, wherein
   the first word line selection transistor includes
   a first diffusion layer and a second diffusion layer that are arranged in a second direction perpendicular to the first direction, and a first gate provided in the first direction between the first diffusion layer and the second diffusion layer.

6. The semiconductor storage device according to claim 1, wherein the voltage supply circuit supplies the first voltage to the first wiring during an erasing operation period for the first memory cell transistor.

7. The semiconductor storage device according to claim 1, wherein the first voltage is a negative voltage.

8. The semiconductor storage device according to claim 1, further comprising a semiconductor layer provided in the second direction in a vicinity of an end portion of the first word line selection transistor, and a second wiring provided above the semiconductor layer and capable of supplying a second voltage to the semiconductor layer.

9. The semiconductor storage device according to claim 8, wherein the second wiring includes a first portion and a second portion that are spaced apart from each other, and the first wiring is provided between the first portion and the second portion.

10. The semiconductor storage device according to claim 8, wherein the second voltage is the ground voltage.

\* \* \* \* \*